United States Patent

[11] 3,616,883

| [72] | Inventor | William F. Sindelar |
| | | Towson, Md. |
| [21] | Appl. No. | 44,049 |
| [22] | Filed | June 8, 1970 |
| [45] | Patented | Nov. 2, 1971 |
| [73] | Assignee | The Black and Decker Manufacturing Company |
| | | Towson, Md. |

[54] ADJUSTABLE CLUTCH
14 Claims, 12 Drawing Figs.

[52] U.S. Cl. ................................................. 192/56 R, 192/110 R, 64/29, 81/52.4 R, 144/32
[51] Int. Cl. ................................................. F16d 7/00, F16d 43/20
[50] Field of Search ................................................. 192/56 R, 150, 110 R; 64/29; 81/52.4 R; 144/32

[56] References Cited
UNITED STATES PATENTS

| 3,491,839 | 1/1970 | McIntire | 64/29 X |
| 3,018,866 | 1/1962 | Elliott et al. | 81/52.4 |
| 2,857,997 | 10/1958 | Graybill | 81/52.4 X |
| 1,883,164 | 10/1932 | Vassakos | 64/29 X |
| 3,174,599 | 3/1965 | Spyridakis et al. | 81/52.4 X |
| 3,442,360 | 5/1969 | Fulop | 81/52.4 X |

FOREIGN PATENTS

| 1,134,678 | 12/1956 | France | 64/29 |

*Primary Examiner*—Allan D. Herrmann
*Attorneys*—Leonard Bloom and Joseph R. Slotnik ABSTRACT: A portable-powered tool for driving screws and the like which includes a housing having a motor therein. An output rotary member is connected to the motor by a positive clutch (actuated when the tool is coupled to a workpiece) and a releasable clutch adapted to slip at a predetermined torque level. The releasable clutch adapted to slip at a predetermined torque level. The releasable clutch includes a novel construction to facilitate efficient operation and long life, and is readily adjustable by means disposed externally of the housing.

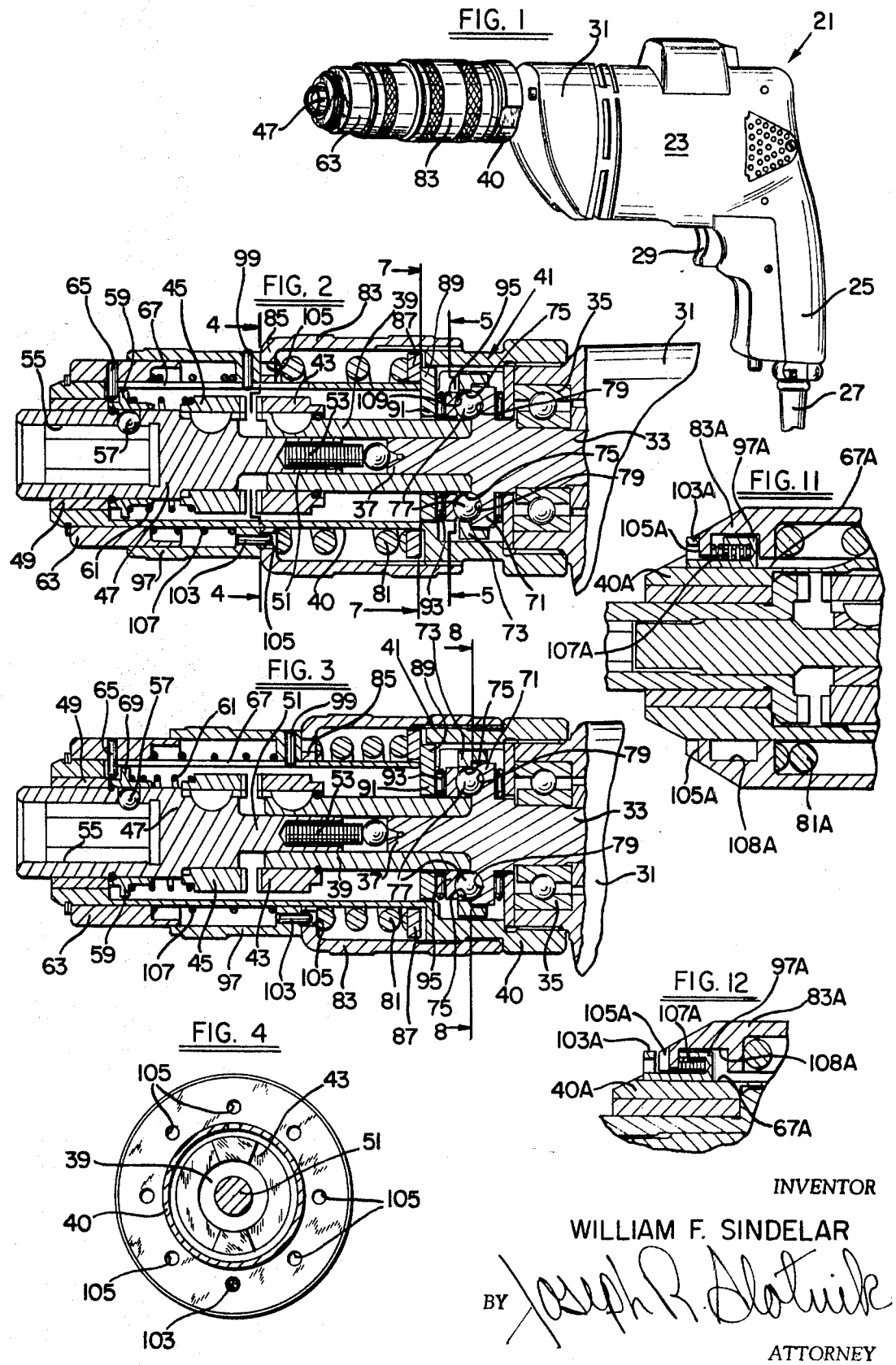

INVENTOR
WILLIAM F. SINDELAR
BY Joseph R. Slotnick
ATTORNEY

3,616,883

ADJUSTABLE CLUTCH

SUMMARY OF THE INVENTION

The present invention is directed to a novel overload releasable clutch means for use in a torque-transmitting tool. The clutch means is disposed internally of the tool housing and is adjustable to vary the torque level at which it releases by manually operable means disposed externally of the housing. The manually operable means is prevented from moving inadvertantly or accidentally by means which may either be readily releasable for quick clutch adjustment "on the job," or it may be releasable only with some difficulty to render the clutch means "tamper resistant."

In addition, the clutch means employs the ball and pocket principle and includes novel means constructed to approach true rolling action of the balls during clutch release, and therefore provides accuracy and consistency in the operation of the clutch throughout its range of adjustment. Furthermore, this construction minimizes wear and insures long life of the parts.

Main objects are to provide a novel torque releasable clutch for use in power tools and the like, which clutch utilizes the ball and pocket principle, and which employs a construction adapted to approach true rolling action of the balls during overload clutch release thereby providing accurate and consistent clutch operation and long life of the parts.

Further important objects of the present invention, therefore, are to provide a novel torque releasable clutch for use in power tools, which clutch is manually adjustable from outside the tool housing by releasable means, and which means may either be readily releasable or tamper resistant, depending upon the particular use to which the tool is to be put, or the needs of the operator.

Additional important objects of the invention are to provide a novel clutch construction of the above character which embodies simplicity and a minimum of parts thereby minimizing size, weight, and cost of the mechanism.

Other objects and advantages of the present invention will become more apparent from a consideration of the detailed description to follow taken in conjunction with the drawings annexed hereto.

BRIEF DESCRIPTION OF THE DRAWINGS

FIG. 1 is a perspective view illustrating a portable tool emboding the present invention;

FIG. 2 is an enlarged sectional view of a portion of FIG. 1 and illustrating a preferred form of the invention;

FIG. 3 is a view similar to FIG. 2 but showing the parts in a different adjusted position;

FIG. 4 is a sectional view of FIG. 2 along the line 4—4 thereof;

FIG. 8 is a sectional view of FIG. 3 taken along the line 8—8 thereof;

FIG. 11 is a fragmentary view similar to FIG. 2 but showing a modified form of the clutch adjustment locking means; and FIG. 12 is a view of a portion of FIG. 11 but showing the parts released for adjustment.

BROAD STATEMENT OF THE INVENTION

Figure 5:
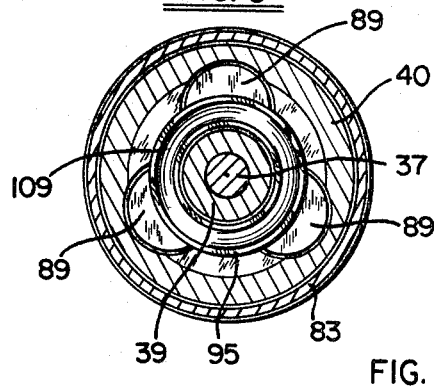
FIG. 5 is a sectional view of FIG. 2 along the line 5—5 thereof.
Figure 7:
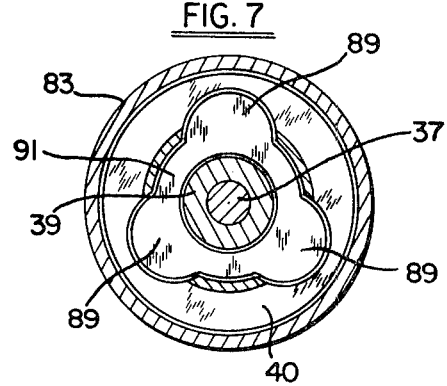
FIG. 7 is a sectional view of FIG. 2 taken along the line 7—7 thereof.

Broadly described, the present invention relates to a power tool comprising a housing, motor means within said housing and including output rotary shaft means, rotary tool means supported by said housing, torque-transmitting clutch means within said housing and interconnecting said output shaft means and said tool means, compression spring means outside said housing and operatively engageable with said clutch means to bias the latter into torque-transmitting relationship, sleeve means encompassing said spring means and longitudinally adjustable on said housing to vary the force of said spring means on said clutch means, and manually releasable means normally engageable with said sleeve means and preventing longitudinal movement thereof relative to said housing.

In another aspect, the present invention relates to a portable power tool for driving screws and the like comprising a housing, a motor driven rotary shaft in said housing, tool spindle means, clutch means interconnecting said rotary shaft and tool spindle means for torque transmission therebetween, said clutch means comprising a plurality of arcuately spaced balls rotatably carried by one and receivable in recesses formed in the other of said rotary shaft and tool spindle means, pressure means engageable with said balls, resilient means normally biasing said pressure means in one direction to hold said balls in said recesses, whereby to transmit torque directly between said rotary shaft and said tool spindle means below a predetermined torque level, said resilient means being yieldable in response to said predetermined torque level in said clutch means to allow said balls to move out of said recesses in the other of said rotary shaft and tool spindle means and roll along surface means between said recesses, whereby said rotary shaft can turn relative to said spindle means, and thrust bearing means between said resilient means and said pressure means, whereby said pressure means is free to turn and enhances true rolling action of said balls between said recesses, whereby substantially no torque above said predetermined level is transmitted from said shaft to said spindle means.

In still another aspect, the present invention relates to a portable power tool comprising a housing, a motor driven rotary shaft in said housing, tool spindle means, clutch means interconnecting said rotary shaft and tool spindle means, said clutch means comprising a plurality of arcuately spaced balls rotatably carried by one and receivable in recesses formed in the other of said rotary shaft and tool spindle means, pressure means internally of said housing and engageable with said balls, resilient means externally of said housing, means partially inside and partially outside said housing operatively interconnecting said resilient means and said pressure means, whereby said resilient means normally biases said pressure means in one direction to hold said balls in said recesses, whereby to transmit torque between said rotary shaft and said tool spindle means, said resilient means being yieldable in response to a predetermined torque in said clutch means to allow said balls to move out of said recesses in the other of said rotary shaft and tool spindle means and roll along surface means between said recesses, whereby said rotary shaft can turn relative to said spindle means, and thrust bearing means between said resilient means and said pressure means, whereby said pressure means is free to turn and facilitates rolling action of said balls between said recesses.

DETAILED DESCRIPTION

Referring now more specifically to the drawings, an electric screwdriver embodying the present invention is illustrated generally at 21 in FIG. 1 an is seen to include a motor housing 23 and is powered from an electric source connected thereto by a cord 27. A trigger 29 in the handle 25 controls the motor.

A gear housing 31 is secured to the front of the motor housing 23 by suitable means and has a shaft 33 rotatably supported therein by a bearing 35 (see FIGS. 2 and 3). The shaft 33 is coupled at its rear end to the motor (not shown) so that when the motor is energized, the shaft 33 rotates. The shaft 33 has a forwardly projecting portion 37 snugly but slidably disposed within a sleeve 39 disposed in a clutch housing 40 secured to the gear housing 31. Rotation is transmitted from the shaft 33 to the sleeve 39 by a novel slip clutch mechanism 41 to be described.

In addition to the clutch 41, the sleeve 39 has a dog clutch member 43 keyed to its forward end and cooperable with a complimentary dog clutch member 45 keyed to an output spindle 47. The output spindle 47 is supported, fore and aft, by a bushing 49 in the forward end of the clutch housing 40 and by a portion 51 snugly but slidably disposed in the forward end of the sleeve 39. The dog clutch members 43, 45 are normally held separated by a compression spring 53 but come together in driving relation when a tool bit (not shown) disposed in a socket opening 55 in the spindle 47 is pressed against a workpiece. The tool bit is retained within the socket opening 55 by a ball 57 and ball retainer 59. A collar 63 slidable on the outside of the clutch housing 40 has a plurality of pins 65 extending through slots 67 in the housing 40 and engageable with a shoulder 69 on the retainer 59 to retract the retainer against the force of a compression spring 61. For a detailed explanation of this tool bit retaining construction, reference may be made to applicant's U.S. Pat No. 3,428,327 granted Feb. 18, 1969, and owned by the assignee of the present application.

The slip clutch 41 is constructed to transmit torque from a motor-driven member (shaft 33) to a tool member (sleeve 39). In accordance with the invention, the slip clutch 41 is manually adjustable by releasable means disposed exteriorly of the clutch housing 40. The clutch 41 employs the ball-pocket principle and achieves both efficient torque transmission and accurate overload release, all with a minimum of parts which are constructed and interrelated in a novel manner to thereby insure accurate operation and long life.

In accordance with another feature of the invention, the basic slip clutch mechanism accommodates a releasable means which is readily operable for easy clutch adjustment during tool use wherein the clutch is adjustable "on the job," or one which is operable only with a certain amount of difficulty so that the clutch is rendered "tamper resistant." In either case, the releasable means acts in a positive manner so that inadvertent or accidental clutch adjustment is prevented.

As shown in FIGS. 2 and 3, a relatively large compression spring 81 is disposed within a collar 83 on the outside of the clutch housing 40. The collar 83 has one end threaded on the clutch housing 40 while a flange 85 at its other end cages one end of the spring 81. The other end of the spring 81 bears against an annular spring plate 87 which, in turn, axially engages a plurality of radial ears 89 formed on a pressure plate 91 disposed in the clutch housing 40. A thrust bearing 93 is positioned between the pressure plate 91 disposed in the clutch housing, and an annular plate or thrust race 95 which bears axially against the balls 77.

It will be appreciated that the force applied axially to the balls 77 tending to hold them in the pockets 79, otherwise referred to as the holding force for the clutch 41, is determined by the force developed by the spring 81. This force, in turn, is adjustable by adjusting the position of the collar 83 on the clutch housing 40 which is achieved simply by turning the collar 83 one way or the other to thread it up or back relative to the housing 40. Since the collar 83 is disposed externally of the tool clutch housing 40, this is achieved without the use of any special tools or without dismantling any parts.

Figure 6:
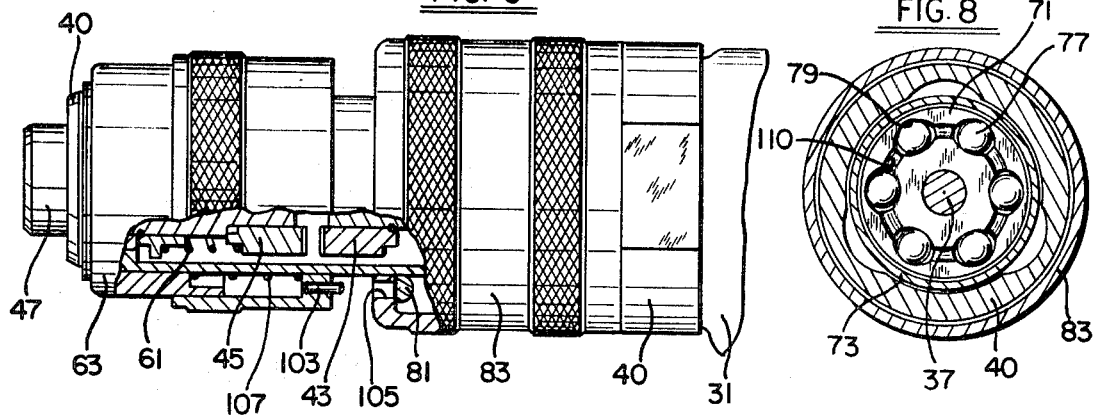
FIG. 6 is a view similar to FIG. 2 but partly in elevation and illustrating the clutch adjusting means in an "unlocked" position.

Furthermore, means is provided to lock the adjusting collar 83 in its adjusted positions and thereby prevent inadvertent or accidental movement thereof and adjustment of the clutch 41. To this end, a locking ring 97 is keyed to the clutch housing 40 by a radial pin 99 which slides in the elongated slot 67. The locking ring 97 also carries an axial pin 103 adapted to be received in one plurality of apertures 105 formed in the flange 85 of the collar 83. A compression spring 107 is caged between the collar 63 and the locking ring 97 and normally biases the latter into locking relation with the collar 83 as seen in FIGS 2 and 3. However, to adjust the position of the collar 83, and the biasing force of the spring 81, it is only necessary to manually grasp and retract the relatively large locking ring 97 against the force of the spring whereby the pin 103 is withdrawn from the aperture 105 (FIG. 6), whereupon the collar 83 can be adjusted. Thereafter, the locking ring 97 is released and the pin 13 repositioned in one of the openings 105, whereupon the collar 83 is again locked in position.

It will be appreciated that although the ring 97 positively locks the collar 83 in place, the ring 97 can be manually withdrawn against the force of the spring 107 and the collar 83 adjusted without the need for any special tools. This is desirable in the case where the tool 21 is to be used on jobs which require different clutch settings and frequent adjustment "on the job." Thus, the operator can quickly and easily perform this adjustment with virtually no loss of time.

Figure 9:
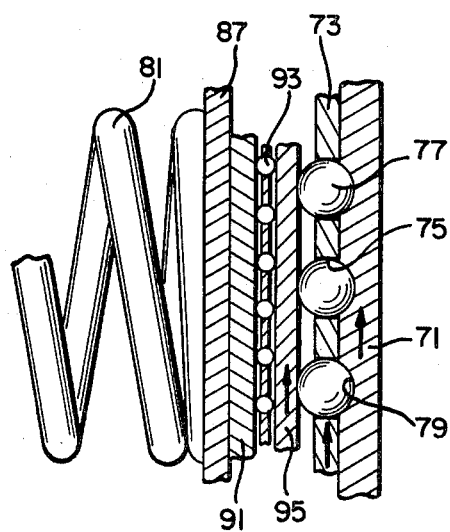
FIG. 9 is a schematic view illustrating the overload releasable clutch parts in torque-transmitting relation.
Figure 10:
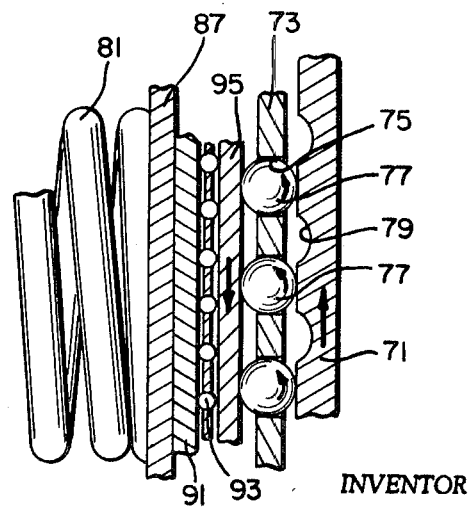
FIG. 10 is a view similar to FIG. 9 but illustrating the clutch parts during overload release.

As described above, the spring 81 biases the thrust race 95 axially against the balls 77 and normally holds them in the pockets 79. As long as the torque level in the shaft 33 and sleeve 39 is less than the force of the spring 81 holding the balls 77 in the pockets 79 (the holding force), and the dog clutch numbers 43, 45 are engaged, the flanges 71, 73, turn together, as illustrated by the arrows in FIG. 9, and the spindle 47 turns directly with the shaft 33. However, as the resistance to free turning builds up in the spindle 47, the torque in the shaft 33 and sleeve 39 increases until, ultimately this torque level exceeds the holding force of the spring 81. When this occurs, the flange 71 turns relative to the flange 73 and the balls 77 are lifted out of the pockets 79 thereby allowing the shaft 33 to slip relative to the sleeve 39. See FIG. 10. Continued turning action of the shaft 33 eventually brings the balls 77 in alignment with another set of pocket 79. If the torque level in the clutch still exceeds the holding force of the spring 81, the balls 77 are again lifted out of these pockets 79 and this action continues until this torque level falls below the holding force of the spring 81, or the tool is turned "off."

During the time that the flange 71 of the shaft 33 is turning relative to the flange 73 of the sleeve 39, it is important that the balls 77 be capable of approximating true rolling action along the face of the flange 71 between the pockets 79. The thrust race 95 performs this task neatly since it is free to turn about the axis of the sleeve 39 and between pressure plate 91 and balls 77 because of the antifriction roller thrust bearing 93 which absorbs the full force of spring 81 yet permits easy rolling. Thus, when the slip torque level of the clutch 41 is reached, the sleeve 39 slows down or ceases to turn while the shaft 33 continues so turning. The flange 71 being rigid with shaft 33 tries to spin the balls 77 in one direction and the thrust race 95, being unrestrained, moves in the other direction and freely allows the balls 77 to so turn as shown by the arrows in FIG. 10. Thus, the balls 77 do not become bound up and the operation of the clutch 41 remains consistent and accurate. To prevent point contact of balls on the race 95 and the flange 71, the thrust race 95 is provided with an annular groove 109 in its radial face and the flange 71 has an annular groove 110 between the pockets 79 to accommodate the balls 77. This provides line contact between the balls 77, pockets 79, and grooves 109, 110 and considerably extends the life of the mechanism.

FIGS. 11 and 12 show a slightly modified form of locking means for holding the clutch adjusting collar in place. In this embodiment, the clutch-adjusting collar, illustrated at 83A, is selectively locked against rotation relative to the clutch housing 40A by a keylike latch member 97A which is slidably disposed in a longitudinal keyway 67A cut in housing 40 and which has a radial projection 103A receivable in one of a plurality of slots 105A in the collar 83A. A compression spring 107A normally biases the projection 103A snugly against the bottom of slots 105A by bearing against one side of an annular groove 108A cut in collar 83 but allows manual retraction for adjustment of the collar 83A and clutch spring 81A.

It will be appreciated that the latch member 97A is releasable from locking engagement with the slotted collar 83A with somewhat more difficulty than was the ring 97 of the embodiment of FIGS. 1–10 since the member 97A is relatively inaccessible and requires a special prying tool to facilitate release. This embodiment, therefore, may be said to be tamper resistant and is particularly suitable for high-production jobs where a torque setting must be maintained for long periods and where inadvertent or deliberate tampering by unauthorized persons is undesirable. In all other respects, the construction of FIGS. 11 and 12 is substantially the same as that illustrated and described above for FIGS. 1-10 inclusive.

By the foregoing, there has been disclosed a novel slip-clutch arrangement calculated to fulfill the inventive objects set forth above, and while preferred forms of the invention have been set forth in detail herein, various additions, substitutions, modifications, and omissions may be made thereto without departing from the spirit of the invention.

I claim:

1. A power tool comprising a housing, motor means within said housing and including output rotary shaft means, rotary tool means supported by said housing, torque-transmitting clutch means within said housing and interconnecting said output shaft means and said tool means, compression spring means outside said housing and operatively engageable with said clutch means to bias the latter into torque-transmitting relationship, sleeve means encompassing said spring means and longitudinally adjustable on said housing to vary the force of said spring means on said clutch means, and manually releasable means normally engageable with said sleeve means and preventing longitudinal movement thereof relative to said housing.

2. A tool as defined in claim 1 wherein said sleeve means is threaded on said housing.

3. A tool as defined in claim 2 wherein said manually releasable means is slidably longitudinally on said housing and nonrotatable relative thereto, said manually releasable means adapted to interlock with said sleeve means to prevent rotation thereof.

4. A tool as defined in claim 2 wherein said manually releasable means includes a manually grippable ring axially slidable on said housing, and spring means normally biasing said ring axially into locking engagement with said sleeve means.

5. A tool as defined in claim 2 wherein said manually releasably means includes a relatively small keylike member axially slidable on said housing, spring means normally biasing said keylike member into locking engagement with axially extending slot means in said sleeve means.

6. A tool as defined in claim 1 which includes thrust-bearing means between said compression spring and said clutch means.

7. A tool as defined in claim 6 wherein said clutch means comprises radially disposed confronting members coupled to said output shaft means and said rotary tool means, one of said members having a plurality of arcuately spaced openings each having a ball disposed therein, the other of said members having arcuately spaced pockets adapted to receive respective ones of said balls, said thrust-bearing means including unrestrained annular means engaging said balls on the side opposite said other member.

8. A tool as defined in claim 1 which includes normally disengaged positive clutch means between said torque-transmitting clutch means and said tool means, said positive clutch means being engageable when said tool means is pressed against a workpiece.

9. A portable power tool for driving screws and the like comprising a housing, a motor driven rotary shaft in said housing, tool spindle means, clutch means interconnecting said rotary shaft and tool spindle means for torque transmission therebetween, said clutch means comprising a plurality of arcuately spaced balls rotatably carried by one and receivable in recesses formed in the other of said rotary shaft and tool spindle means, pressure means engageable with said balls, resilient means normally biasing said pressure means in one direction to hold said balls in said recesses, whereby to transmit torque directly between said rotary shaft and said tool spindle means below a predetermined torque level, said resilient means being yieldable in response to said predetermined torque level in said clutch means to allow said balls to move out of said recesses in the other of said rotary shaft and tool spindle means and roll along surface means between said recesses, whereby said rotary shaft can turn relative to said spindle means, and thrust bearing means between said resilient means and said pressure means, whereby said pressure means is free to turn and enhances true rolling action of said balls between said recesses, whereby substantially no torque above said predetermined level is transmitted from said shaft to said spindle means.

10. A tool as defined in claim 9 wherein said pressure means includes an annular member bearing against said balls on the side thereof opposite said recesses, said annular member being unrestrained against turning movement about a central axis thereof, said balls being disposed around a circle coaxial with said annular member.

11. A tool as defined in claim 10 wherein said recesses, said balls, and said annular member are axially disposed.

12. A portable power tool comprising a housing, a motor driven rotary shaft in said housing, tool spindle means, clutch means interconnecting said rotary shaft and tool spindle means, said clutch means comprising a plurality of arcuately spaced balls rotatably carried by one and receivable in recesses formed in the other of said rotary shaft and tool spindle means, pressure means internally of said housing and engageable with said balls, resilient means externally of housing, means partially inside and partially outside said housing operatively interconnecting said resilient means and said pressure means, whereby said resilient means normally biases said pressure means in one direction to hold said balls in said recesses, whereby to transmit torque between said rotary shaft and said tool spindle means, said resilient means being yieldable in response to a predetermined torque in said clutch means to allow said balls to move out of said recesses in the other of said rotary shaft and tool spindle means and roll along surface means between said recesses, whereby said rotary shaft can turn relative to said spindle means, and thrust-bearing means between said resilient means and said pressure means, whereby said pressure means is free to turn and facilitates rolling action of said balls between said recesses.

13. A tool as defined in claim 12 wherein said interconnecting means includes a plate disposed inside said housing and having radial projections extending outside said housing.

14. A tool as defined in claim 12 wherein said interconnecting means is nonrotatably associated with said housing.

* * * * *